United States Patent [19]

Fox et al.

[11] Patent Number: 5,317,861
[45] Date of Patent: Jun. 7, 1994

[54] METHOD OF OPERATING A COMBUSTION SECTION SUPPLY SYSTEM HAVING FUEL AND WATER INJECTION FOR A ROTARY MACHINE

[75] Inventors: Theodore G. Fox, Newington; Martin J. Walsh, Bristol; Bethuel M. Barnum, Avon; Jan B. Peyrot, Glastonbury, all of Conn.

[73] Assignee: United Technologies Corporation, Hartford, Conn.

[21] Appl. No.: 959,958

[22] Filed: Oct. 13, 1992

Related U.S. Application Data

[62] Division of Ser. No. 695,377, May 3, 1991, Pat. No. 5,175,994.

[51] Int. Cl.$^5$ ............................................... F02C 3/30
[52] U.S. Cl. ........................................................ 60/39.05
[58] Field of Search ................. 60/39.05, 39.53, 39.55, 60/39.58, 39.59, 39.463, 39.465

[56] References Cited

U.S. PATENT DOCUMENTS

| | | | |
|---|---|---|---|
| 3,921,389 | 11/1975 | Kawaguchi | 60/39.59 |
| 4,110,973 | 9/1978 | Haeflich et al. | 60/39.55 |
| 4,214,435 | 7/1980 | Campbell | 60/39.59 |
| 4,977,740 | 12/1990 | Madden et al. | 60/39.55 |
| 5,054,279 | 10/1991 | Hines | 60/39.59 |

FOREIGN PATENT DOCUMENTS

81127 5/1982 Japan ................................. 60/39.58

*Primary Examiner*—Louis J. Casaregola
*Attorney, Agent, or Firm*—Gene D. Fleischhauer

[57] ABSTRACT

A fuel supply system 32 for a rotary machine 10 is disclosed. Various construction details are developed which enable operation of a plurality of fuel injectors 28 in the machine at a low pressure drop with a wide range of fuel and water fuel rates. In one embodiment, an auxiliary water supply system supplies water at a location in close proximity to the fuel injector.

4 Claims, 3 Drawing Sheets

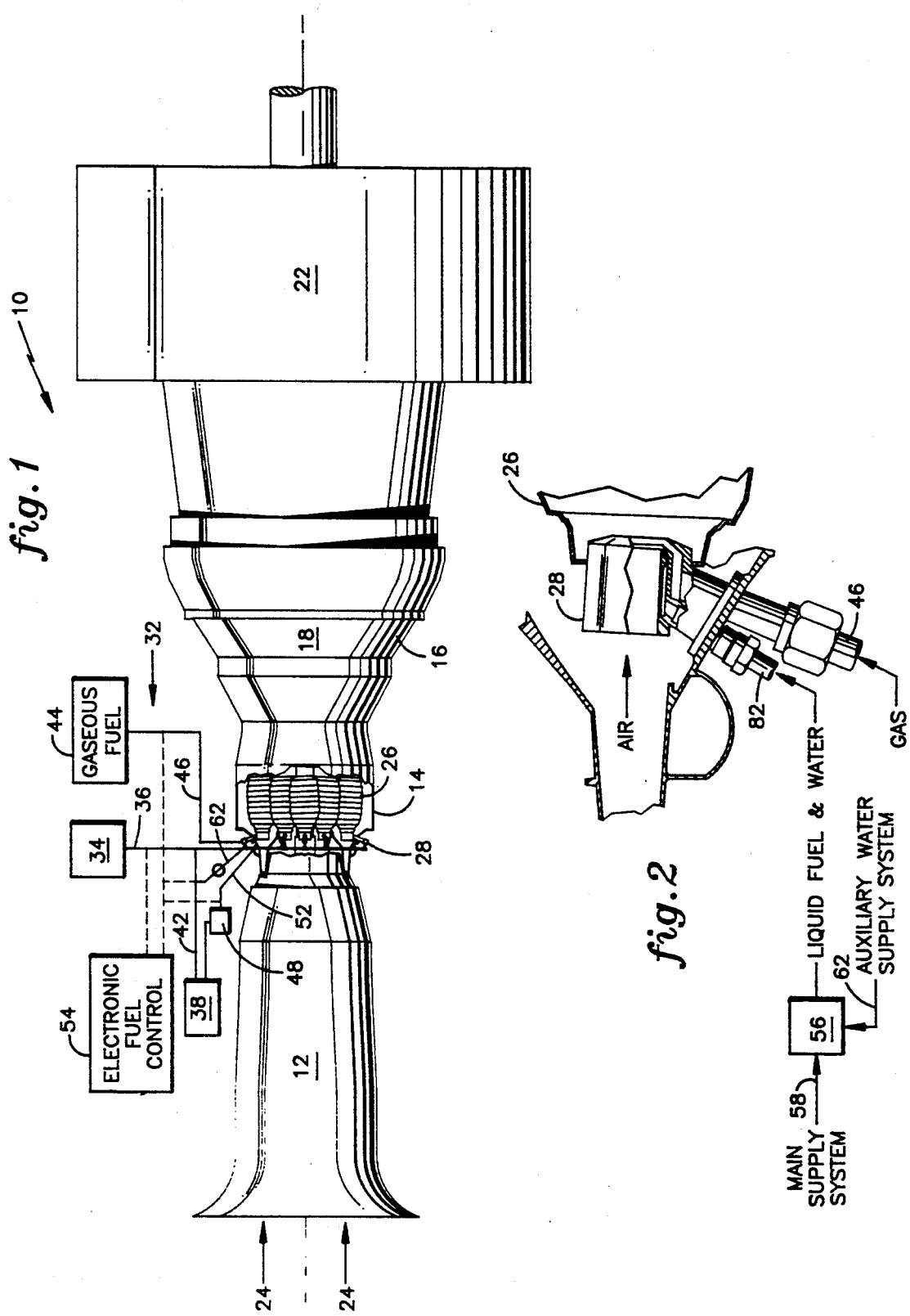

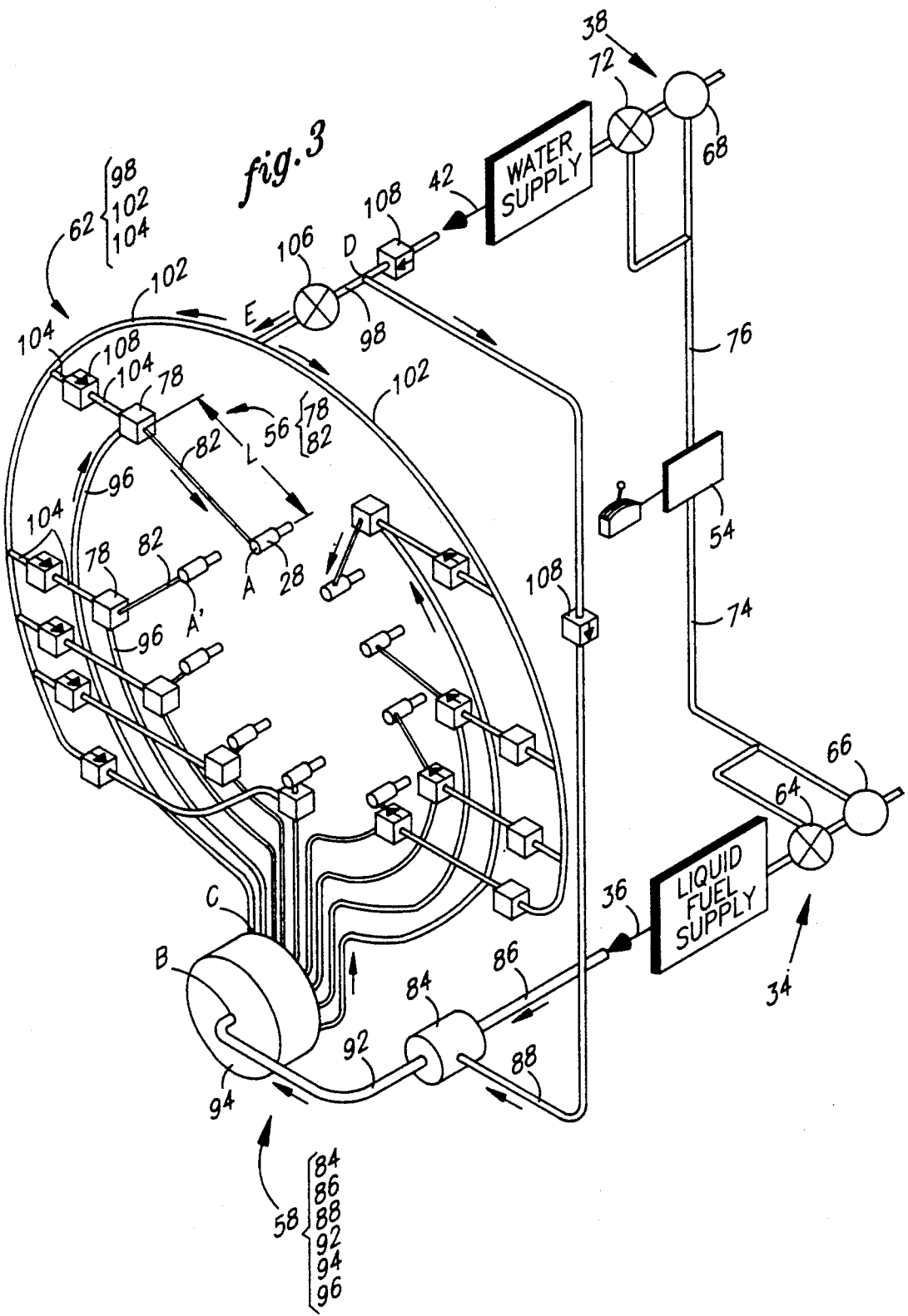

METHOD OF OPERATING A COMBUSTION SECTION SUPPLY SYSTEM HAVING FUEL AND WATER INJECTION FOR A ROTARY MACHINE

This is a division of U.S. Pat. No. 5,175,994 copending application Ser. No. 07/695,377 filed on May 3, 1991.

TECHNICAL FIELD

This invention relates to a fuel supply system for a plurality of fuel injectors and more particularly to a system for supplying water and fuel to the fuel injectors to reduce emissions over a wide range of flow rates. Although this invention was developed in the field of axial flow, rotary machines, it has application to other fuel supply systems having a plurality of fuel injectors or fuel nozzles.

BACKGROUND OF THE INVENTION

An axial flow, gas turbine engine has a compression section, a combustion section and a turbine section. An axial flow path for working medium gases extends through these sections of the engine. The working medium gases are compressed in the compression section. The compressed gases are mixed with fuel in the combustion section and burned to add energy to the gases. The hot, pressurized gases are expanded through the turbine section where work is extracted from the gases.

Examples of typical fuel supply systems which provide for fuel and water mixing and dividing arrangements are shown in U.S. Pat. No. 4,214,435 entitled "Method For Reducing Nitrous Oxide Emissions Form A Gas Turbine Engine" issued to Campbell and U.S. Pat. No. 4,918,925 entitled "Laminar Flow Fuel Distribution System" issued to Tingle.

One device for delivering fuel to the combustion section is a fuel nozzle or fuel injector The fuel injector may have a relative pressure drop in comparison to the pressure drop of the fuel supply system which is relatively high. In such constructions, maldistribution of the fuel supplied to the plurality of fuel injectors is not a concern. Maldistribution is small, because the fuel supply system pressure drop is small in comparison to the pressure drop of the fuel injector and that pressure drop, which is the same for all fuel injectors, remains relatively constant between injectors for a given flow rate.

Another type of fuel nozzle or fuel injector has a very relatively low pressure drop in comparison to the pressure drop of the fuel supply system. An example of such a fuel injector is shown in U.S. Pat. No. 4,977,740 entitled "Dual Fuel Injector" issued to Thomas J. Madden, Barry C. Schlein, and W. Barry Wagner, which is assigned to the Assignee of this Application. This particular fuel injector uses both gaseous and liquid fuels and is designed to operate with water injection system for supplying water to the burning fuel to reduce the formation of nitrous oxides (NOx).

Maldistribution problems are a particular concern in such arrangements because the fuel injector pressure drop is relatively small and the fuel supply system must operate over a wide flow range. For example, water flow rates which are up to one and a half (1½) times the fuel flow rate may be required to control emissions.

Large manifold pipes are necessary to accommodate the highest combined flow rates with reasonable pressure losses as dictated by the maximum fuel pump output capacity. At low flow rates, such as the engine starting condition, the length of time to fill the manifold pipes prior to commencing the starting sequences are excessively long.

Accordingly, scientist and engineers working under the direction of Applicants' Assignee have sought to develop a fuel supply system which can accommodate a wide range of flow rates and a wide range of water-fuel ratios during operative conditions while minimizing maldistribution problems.

DISCLOSURE OF THE INVENTION

This invention is in part predicated on the recognition that increasing the water-fuel ratio as flow rates increase is desirable for emissions but may cause the problem of blow out of the combustion chamber if the flow rate is suddenly decreased, such as might occur in an emergency situation. This occurs because a combustible liquid having a high water-fuel ratio remains in the system for a short time even though the flow rate of the combustible liquid has been decreased. At low flow rates, the high water-fuel ratio may cause blow out of the flame in the combustion chamber. Blow outs are to be avoided because of problems associated with relighting the combustion chamber which already contains fuel from the blow out condition.

According to the present invention, an axial flow rotary machine has a combustion section having a plurality of fuel injectors and a fuel supply system for the injectors, the fuel supply system including:

1. an auxiliary mixing system having an auxiliary mixer at each fuel injector for supplying fuel and water to the fuel injector;

2. a main supply system having a main mixer for fuel and water for supplying a combustible liquid to the auxiliary mixing system; and, 3. an auxiliary water supply system in flow communication with the auxiliary mixing system which adapts the engine to supply additional amounts of water to the injector at preselected operative conditions of the machine.

In accordance with one detailed embodiment of the present invention, the auxiliary water supply system includes a shunt conduit extending from a point upstream of the main mixer to the auxiliary mixing system to divert water from the main supply system via an alternate path at high water and fuel flow operative conditions permitting an increased flow of fuel through the main supply system.

In accordance with the present invention, the fuel supply system includes a source of gaseous fuel in flow communication with the fuel injector, and the method of operating the engine includes flowing water through the main supply system at low flow rates and through the auxiliary water supply system at higher flow rates.

According to the present invention, a method of operating an axial flow rotary machine includes the steps of supplying a combustible liquid comprising fuel and water via a main supply system at low flow operative conditions of the engine and, at high flow operative conditions, supplying a substantial portion of the water via an auxiliary water supply system such that the amount of water mixed with fuel in the main supply system will not cause blow out of the combustion chambers during transient conditions should the flow rate of liquid fuel and water to the combustion section suddenly drop.

A primary feature of the present invention is an auxiliary mixing system having an auxiliary mixer at each fuel injector. In one embodiment, the auxiliary mixer is in close proximity to the fuel injector. Another feature is a main supply system having a main mixer. The main mixer is in flow communication with a source of fuel and a source of water. Still another feature of the present invention is the pressure drop characteristic of the main supply system and the pressure drop characteristic of the auxiliary water supply system. The pressure drop characteristics are sized to avoid maldistribution in the main supply system at low flow rates and maldistribution in the auxiliary water supply system at high flow rates. Still another feature is a device for supplying water to the auxiliary supply system under preselected operative conditions, such as a regulating valve responsive to back pressure. A feature is the pressure characteristic of the valve selected so that once the valve opens flow from the source of water will preferentially flow through the auxiliary system at much greater rates than through the main supply system and may be under some operative conditions, nearly nonexistent in the main supply system. In one detailed embodiment, the fuel supply system has a flow divider valve for dividing the flow in the main supply system. The fuel injector is an air atomizing injector which operates at low pressures at low flows and the manifolds leading from the fuel divider valve have equal volumes to provide a pressure characteristic for the lines which avoids maldistribution at low flow operating conditions. In one embodiment, the fuel injector is adapted to receive gaseous fuel from a source of supply such as a natural gas line and the main supply system supplies water at low flow rates and the auxiliary system may be used to provide additional water at high flow rates.

A primary advantage of the present invention is the ability of the engine to go from high operating flow rates with a combustible liquid fuel (such as a mixture of hydrocarbons and water) to low operating flow rates without blow out of the combustion chamber which avoids the dangers associated with a re-light of the combustion chamber after such a blow out. Another advantage of the present invention is the reduced emissions which results from using water-fuel ratios which differ for different flow rates and providing a balanced supply of the combustible liquid to a plurality of fuel injectors over a range of flow rates which results from employing an auxiliary water supply in conjunction with a main supply system.

The foregoing features and advantages of the present invention will become more apparent in light of the following detailed description of the best mode for carrying out the invention and in the accompanying drawings.

BRIEF DESCRIPTION OF DRAWINGS

FIG. 1 is a side elevation view of a gas turbine engine which is partially broken away to show the combustion section of the engine.

FIG. 2 is a enlarged view of a portion of the gas turbine engine shown in FIG. 1.

FIG. 3 is a schematic representation of the fuel supply system for a gas turbine engine shown in FIG. 1.

BEST MODE FOR CARRYING OUT THE INVENTION

Figure 4:
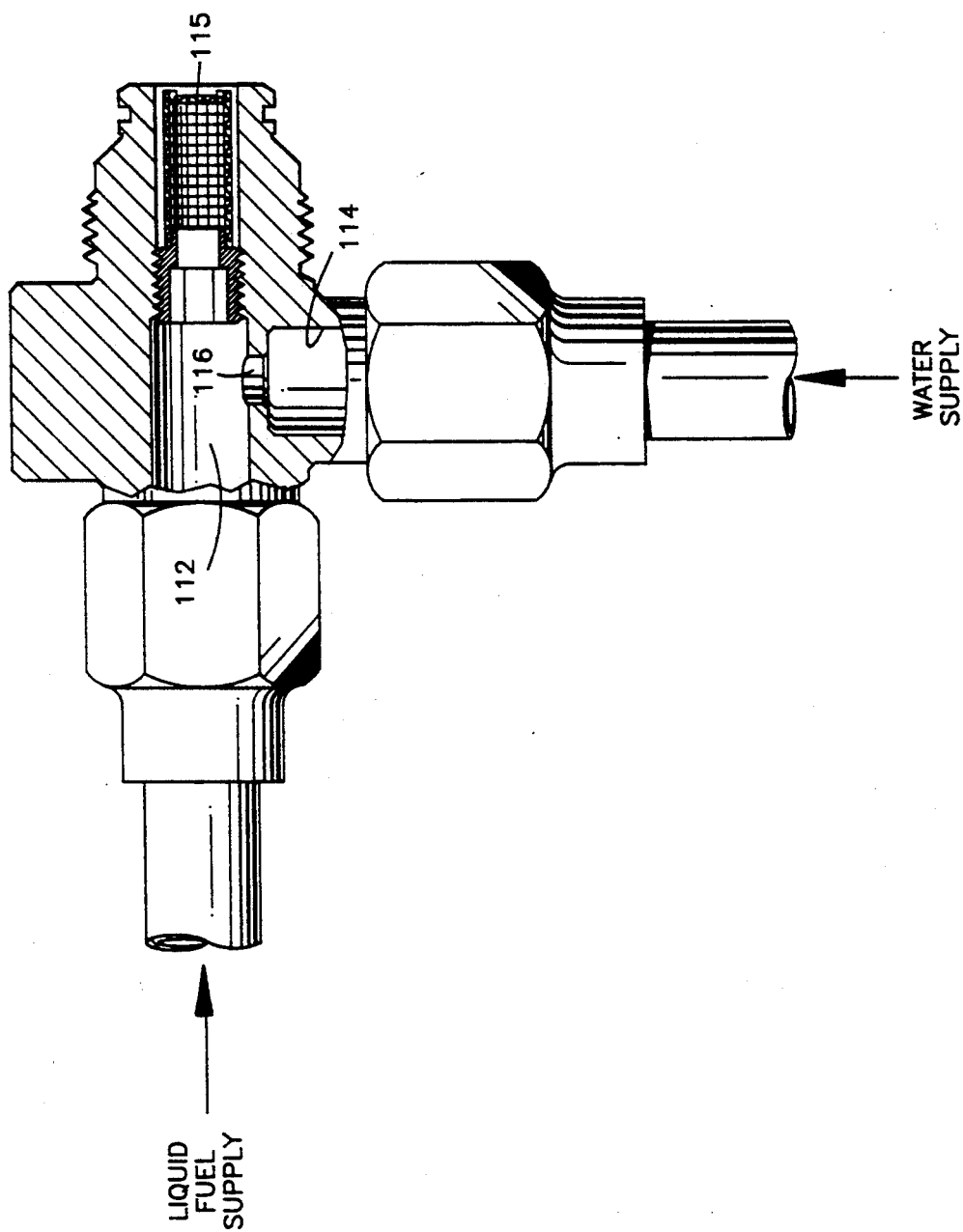
FIG. 4 is a cross-sectional view of an auxiliary mixer for the fuel supply system shown in FIG. 3.

FIG. 1 is a side elevation view of an axial flow, rotary machine 10, such as a gas turbine engine, having a portion of the engine broken away. The engine has a compression section 12, a combustion section 14 and a turbine section 16. The turbine section includes a turbine 18 for powering the compression section and an associated free turbine 22 for extracting work from the engine for other purposes. An annular flowpath 24 for working medium gases extends axially through these sections of the engine.

The combustion section 14 includes a plurality of combustion chambers 26 as shown or alternatively might comprise a singular annular combustion chamber. The combustion chamber or chambers are provided with a plurality of fuel injectors 28. A fuel supply system 32 is in flow communication with the fuel injectors.

The fuel supply system is also in flow communication with a source of liquid fuel 34 via liquid fuel conduit 36 and a source of water 38 via a water supply conduit 42. These conduits enable the fuel supply system to supply a combustible liquid to the fuel injector at a first flow rate at a first operative condition of the engine and at a second flow rate at a second operative condition of the engine. The fuel supply system is also in flow communication with a source of gaseous fuel 44 via a gaseous fuel conduit 46. Thus, the fuel flowing to the fuel injector via the fuel supply system may be a liquid or a gas. The water flowing to the injector may be a liquid or a gas, such as steam.

Steam might be provided by passing the water through a heat exchanger 48. The heat exchanger may be regenerately heated by the hot gases discharged from the gas turbine engine. The steam may be mixed with the gaseous fuel in conduit 46 or supplied via a separate conduit 52 as shown.

A control means, such as an electronic fuel control 54, is responsive to engine power. The control means establishes the flow rate of fuel and water to the fuel supply system 32. The flow rate of water is a predetermined function of the fuel flow rate. The fuel flow rate is a function of power, water flow rates, exhaust gas temperature, ambient temperature, and other parameters.

FIG. 2 is an enlarged view of a portion of the combustion section 14 of the engine shown in FIG. 1. FIG. 2 shows a portion of the combustion chamber 26, a fuel injector 28 having a low difference in pressure across the fuel injector and conduits for liquid fuel and water and for gaseous fuel 46.

The working medium flow path 24 passes from the compression section 12 into the combustion section 14. Each combustion chamber 26 is adapted by one or more openings to receive pressurized gases in the form of air from the working medium flow path. The fuel injector 28 is disposed in an associated opening in the combustion chamber to pass the pressurized gases (air) into the combustion chamber and to inject fuel and water into the air as the air is discharged into the discharge region of the injector. One or more igniters (not shown) extend into the combustion chamber to ignite the mixture of fuel and air as the air passes from the discharge region of the fuel injector at the start up condition of the engine.

The fuel supply system 32 is shown in schematic fashion and includes an auxiliary mixing system 56 for each fuel injector 28. The auxiliary mixing system is in flow communication with a main supply system 58 and an auxiliary water supply system 62 via an auxiliary mixer (not shown).

FIG. 3 is a schematic representation of the fuel supply system 32 for the gas turbine engine 10 shown in FIG. 1 and FIG. 2. The source of liquid fuel 34 includes a modulator valve 64 and a liquid fuel pump 66 for supplying liquid fuel. The source of water 38 includes a water pump 68 and modulator valve 72 for supplying water to the fuel supply system. The control means 54 is responsive to engine power and is in signal communication with the pump and modulator valves via lines 74, 76 to supply water as a function of fuel flow rate.

The auxiliary mixing system 56 for the plurality of fuel injectors 28 includes an auxiliary mixer 78 at each fuel injector. The auxiliary mixer 78 is adapted to mix with water a liquid fuel or a combustible liquid containing a hydrocarbon fuel and water to form a combustible liquid having a higher water-fuel ratio.

A first conduit 82 extends from the fuel injector 28 to the auxiliary mixer 78. The first conduit is in flow communication with the auxiliary mixer and with the fuel injector at a first point A. The conduit has a hydraulic diameter $D_h$ and a length L which is less than fifty (50) times than the hydraulic diameter $D_h$ of the conduit. Thus, the volume of the conduit falls below a predetermined limit and limits the volume of combustible liquid in the first conduit at any time during the operation of the engine. This is especially important at high flow rates because the water-fuel ratio of the combustible liquid in the first conduit is high and may cause a blow out if the flow rate suddenly drops. This avoids a blow out by having the volume of each first conduit less than this predetermined amount and lessening the amount of time this undesirable high water-fuel ratio fluid flows during transient operation, such as from the second (high flow rate) operative condition to the first (low flow rate) operative condition.

The main supply system includes a main mixer 84, a second conduit 86, a third conduit 88, a fourth conduit 92, a flow divider valve 94, and a plurality of fifth conduits 96. The main mixer is adapted by its construction to mix liquid fuel and water to form a combustible liquid. The second conduit 86 extends from the main mixer to place the main mixer 84 in flow communication with the source of liquid fuel 34 via the fuel supply conduit 36. The third conduit 88 extends from the main mixer to place the main mixer in flow communication with the source of water 38 at a fourth point D via the water supply conduit 42. The fourth conduit 92 extends downstream from the main mixer 84. The fourth conduit 92 is adapted to place the main mixer 84 in flow communication with the flow divider valve 94. The flow divider valve is downstream of the main mixer and is in flow communication with the main mixer through the fourth conduit at a second point B.

The plurality of fifth conduits 96 extend at a third point C from the flow divider valve. Each fifth conduit extends to an associated auxiliary mixer 78 of the auxiliary mixing system 56 to place the auxiliary mixer 78 in flow communication with the flow divider valve 94.

The auxiliary water supply system includes a sixth conduit 98, a water manifold 102 and a plurality of seventh conduits 104. The sixth conduit, water manifold and an associated seventh conduit form a shunt system or conduit around the main supply system as shown in FIG. 1 and FIG. 3.

The sixth conduit 98 is in flow communication with the source of water 38 at a fourth point D. The sixth conduit includes a regulating valve 106 downstream of the fourth point D. The regulating valve is in flow communication with the source of water and is responsive to back pressure such that the regulating valve opens at the second operative condition of the engine. Opening the regulating valve permits the flow of water via the regulating valve to the water manifold. The pressure flow distribution characteristic of the auxiliary water supply system minimizes maldistribution at this higher flow rate in the auxiliary water supply system. Maldistribution is also avoided in the main supply system through the continued use of the flow divider valve.

The water manifold 102 is in flow communication with the sixth conduit 98 at a point E downstream of the regulating valve 106. The plurality of seventh conduits 104 each extend from the water manifold to an associated auxiliary mixer 98 of the auxiliary mixing system 56.

The volume of the main supply system 58 from the flow divider valve 94 via one fifth conduit 96 and the auxiliary mixing system 56 to the fuel injector 28 (B-A) is substantially equal to the volume from the flow divider valve to the fuel injectors of the other fifth conduits and auxiliary systems (such as B-A') to ensure the combustible liquid arrives at each fuel injector 28 at approximately the same time during start up of the axial flow rotary machine.

The pressure-flow distribution characteristic of the main supply system from the flow divider valve to the fuel injector provides for approximately equal flow to each fuel injector for the first flow rate during operative conditions of the engine that are less than the second flow rate.

The pressure-flow distribution characteristic of the auxiliary water supply system from the regulator valve of the supply system to the fuel injector (E-A) provides for approximately equal flow rates from the auxiliary water supply system to each fuel injector at the second flow rate to ensure that equal amounts of additional water are provided to each fuel injector.

As shown, the water supply conduit 102, the third conduit 88 and each seventh conduit 104 have check valves 108 disposed in said conduit to permit flow only toward the fuel injector 28 in the main supply system and in the auxiliary supply system.

FIG. 4 shows in more detail the auxiliary mixer 78 of the auxiliary mixing system 56. The auxiliary mixer includes a first chamber 112 in flow communication with a screen 115 for mixing the fuel and water or a combustible liquid and water. The first chamber is in flow communication with the source of fuel 34. A second chamber 114 is in flow communication with the water supply system via the auxiliary water supply system 62. The second chamber has an orifice 116 at right angles to the first chamber for flowing the fuel and water together into the first chamber prior to the mixing which takes place in the screened portion of the chamber.

During operation of one hypothetical gas turbine engine of the type shown in FIG. 1, the engine is started at a fuel flow rate for example of approximately six hundred (600) pounds per hour of pure fuel. Upon ignition, the fuel rate is increased to two thousand (2000) pounds per hour with a mixture of approximately seven hundred (700) pounds per hour of water being provided via the main supply system 58. At this point, the regulating valve 106 to the auxiliary water supply system 62 has not opened. The water to fuel ratio is approximately thirty-five hundredths (0.35). As the fuel flow rate increases up to a limit of three thousand (3000) pounds per hour of fuel, the water flow rate increases and the water to fuel ratio may be increased. Below these fuel and water flow rates, the fuel supply system only uses the main supply system to deliver fuel and water to the fuel injectors.

At medium power above a fuel flow rate of three thousand (3000) pounds per hour, the flow rates are typically in the range of five thousand to six thousand (5000-6000) pounds per hour. At this flow rate, the regulator valve 106 opens enabling a flow rate of approximately three thousand (3000) pounds per hour of water via the auxiliary water supply system 62. With this flow rate, good distribution occurs in all manifolds. Some water does enter the main supply system because of the pressure balance. As flow rates approach twelve thousand (12,000) pounds per hour of fuel, the fuel flows entirely through the main supply system with only trace amounts of water (if any) in the main supply system 58. The remainder of the water is supplied via the auxiliary water supply system 62 where it is mixed with fuel in the auxiliary mixing system. The flow rate of the water may be increased until the water-fuel ratio is greater than one (1.0) and approaches 1.3 at very high powers.

If there is a snap deceleration for emergency reasons, such as reducing power to the power turbine because of reductions in load or to stop the generator from overspeeding, the flow rate drops dramatically to a low flow rate. For example, the flow rate may drop to a flow rate of seven hundred and fifty (750) pounds per hour. Prior to this time, for example, we might have had twelve thousand (12,000) pounds per hour of fuel flowing and fifteen thousand (15,000) pounds per hour of water. Thus, the flow rate through the fuel injectors into the combustion chamber suddenly drops. However, combustible liquid in the first conduit 82 of the auxiliary mixing system 56 is at a water to fuel ratio which is quite high. Were the engine to operate at this high water to fuel ratio for any length of time, the flame in the combustion chamber 26 would blow out. The first conduit is sized small enough so that this high water to fuel ratio is transient, disappearing quickly because at low flow rates only fuel is being flowed into the auxiliary mixing system 56 through the main supply system 58. Blow outs are avoided.

If the first conduit had a substantial volume, the high water to fuel ratio would not be transient. A blow out of the combustion chamber might occur. Such blow outs can cause an explosion even when fuel behind the engine ignites as re-ignition of the engine takes place.

In summary, the method of operating the engine enables flowing a combustible liquid comprising fuel and water at a fairly low water to fuel ratio at low fuel rates. As flow rates are increased, more and more water is diverted to the auxiliary water supply system so that the water-fuel ratio in the main supply system stays small. However, the water-fuel ratio for the overall fuel supply system (that is, as it comes out of the auxiliary mixing system) is quite high. During transient operation, a small volume of the first conduit avoids the blow out by the high water-fuel ratio liquid because of the small amount of such liquid which is quickly replaced by the low water-fuel ratio liquid that is being supplied via the main supply system with the auxiliary water supply system shut down.

The fuel supply system has particular advantage when operated with gaseous fuel as well. At lower gaseous fuel flow rates, water is supplied via the main supply system 58 to the fuel injectors 28 to ensure the correct amount of water is equally supplied to each injector. The pressure distribution characteristic of the main supply system (primarily the fuel distribution valve) ensures that equal flow distribution occurs even at low flows. As the gaseous fuel flow increases, the amount of water being flowed to the fuel injector increases. As the flow of water reaches a predetermined level, the regulating valve 106 opens in the sixth conduit 98 enabling additional water to flow via the water manifold and auxiliary mixing system to each fuel injector. In this embodiment, water is flowed via both chambers 112, 114 in the auxiliary mixer.

Although the invention has been shown and described with respect to detail embodiments thereof, it should be understood by those skilled in the art that various changes in form and detail thereof may be made without departing from the spirit and scope of the claimed invention.

We claim:

1. A method of operating an axial flow rotary machine having a plurality of fuel injectors disposed in a combustion chamber, the fuel injectors in flow communication with a source of fuel and a source of water and employing an auxiliary mixing system in flow communication with the fuel injectors, a main supply system in flow communication with the auxiliary mixing system and an auxiliary water supply system in flow communication with the auxiliary mixing system, comprising:

supplying a combustible liquid comprising fuel and water at a first water-fuel ratio to the fuel injectors via a main supply system at a low flow operative condition of the engine via the auxiliary mixing system, and supplying a combustible liquid comprising fuel and water at a second water-fuel ratio which is higher than the first water-fuel ratio at a high flow operative condition of the engine, which includes flowing a substantial portion of the water at the high flow operative condition via an auxiliary water supply system to an auxiliary mixer such that the additional amount of water is not in the main supply system and the amount of water mixed with fuel in the main supply system immediately upstream of the auxiliary mixing system is at a water-fuel ratio which will not cause blow out of the combustion chamber when the combustible fluid from the main supply system flows through the auxiliary mixing system and reaches the combustion chamber during transient conditions at which the flow rate of liquid fuel and water to the combustion section suddenly drops and the amount of water supplied via the auxiliary water supply system drops.

2. A method of operating a gas turbine engine having a combustion section which includes a plurality of fuel injectors, the engine having a first operative condition at a first flow rate for fuel and water and having a second operative condition at a second flow rate for fuel and water which is greater than the first flow rate, the engine including an auxiliary mixing system having an auxiliary mixer for fuel and water, a main supply system having a main mixer for fuel and water and an auxiliary water supply system, the method comprising:

flowing at the first flow rate for the first operative condition a combustible liquid comprising liquid fuel and water at a first water-fuel ratio to the fuel injectors via the main supply system at the first operative condition of the engine including flowing the combustible liquid through the auxiliary mixing system which includes mixing the combustible liquid in the auxiliary mixer to provide additional mixing to the liquid fuel and water mixture;

flowing at the second flow rate for the second operative condition of the engine a combustible liquid comprising water and fuel at a second water-fuel ratio to the fuel injectors which is greater than the first water fuel ratio at the first operative condition via the auxiliary mixing system including flowing through the main supply system a combustible liquid which comprises fuel and water at a third water-fuel ratio that is less than or equal to the first water-fuel ratio, and flowing an additional amount of water through the auxiliary water supply system to the auxiliary mixer at the second operative condition to provide an additional amount of water to the auxiliary mixing system;

mixing the additional amount of water in the auxiliary mixer with the combustible liquid formed of liquid fuel and water from the main supply system at the second operative condition of the engine to increase the water-fuel ratio of the combustible liquid to the second water-fuel ratio;

flowing the combustible liquid from the auxiliary mixing system to the fuel nozzle for discharge into the working medium flow path of the engine;

wherein the volume of combustible liquid in the engine downstream of the auxiliary mixer at the second water-fuel ratio is small enough so that on a sudden decrease in power and flow rate to the first flow rate, blow out is avoided in the combustion section even though the water-fuel ratio is too high to sustain combustion at that first flow rate for a period of time that is longer than the time needed to consume the volume of fuel in the auxiliary mixing system.

3. A method of operating a gas turbine engine having a combustion section which includes a plurality of fuel injectors, the engine having a first operative condition at a first flow rate for fuel and water and having a second operative condition at a second flow rate for fuel and water which is greater than the first flow rate, the engine including an auxiliary mixing system having an auxiliary mixer for fuel and water, a main supply system having a main mixer for fuel and water and an auxiliary water supply system, the method comprising:

flowing at the first flow rate a combustible liquid comprising liquid fuel and water at a first water-fuel ratio to the fuel injectors via the main supply system at the first operative condition of the engine including mixing the liquid fuel and water by flowing the water and liquid fuel through the main mixer to mix the liquid fuel and water to form a combustible liquid;

flowing the combustible liquid through the auxiliary mixing system which includes mixing the combustible liquid in the auxiliary mixer to provide additional mixing to the liquid fuel and water mixture;

flowing the combustible liquid from the auxiliary mixing system to the fuel injector for discharge into the working medium flowpath of the engine;

flowing at the second flow rate a combustible liquid comprising water and fuel at a second water-fuel ratio which is greater than the first water-fuel ratio via the auxiliary mixing system including flowing through the main supply system a combustible liquid which comprises fuel and water at a third water-fuel ratio that is less than or equal to the first water-fuel ratio, including mixing the fuel and water by flowing the water and liquid fuel through the main mixer to mix the fuel and water to form a combustible liquid;

flowing an additional amount of water through the auxiliary water supply system at the second operative condition to provide an additional amount of water to the auxiliary mixing system;

mixing the additional amount of water in the auxiliary mixer with the combustible liquid formed of liquid fuel and water from the main supply system at the second operative condition of the engine to increase the water-fuel ratio of the combustible liquid to the second water-fuel ratio;

flowing the combustible liquid from the auxiliary mixing system to the fuel injector for discharge into the working medium flowpath of the engine;

wherein the volume of combustible liquid at the second water-fuel ratio is small enough so that on a sudden decrease in power and flow rate to the first flow rate, blow out is avoided in the combustion section even though the water-fuel ratio is too high to sustain combustion at that flow rate for a period of time that is longer than the time needed to consume the volume of fuel in the auxiliary mixing system.

4. The method of operating the gas turbine engine of claim 3 wherein the engine has a third operative condition at which gaseous fuel is flowed to the fuel injector of the engine at a first flow rate for gaseous fuel and includes flowing water through the main supply system to supply water to the fuel injector via the auxiliary mixing system and the engine has a fourth operative condition at which gaseous fuel is flowed to the fuel injector of the engine at a second flow rate for gaseous fuel which is greater than the first flow rate and wherein the method includes flowing water through the main supply system and through the auxiliary supply system to supply water and fuel at a water-fuel ratio which is greater than the water-fuel ratio at the third operative condition.

* * * * *